(12) United States Patent
Pater (10) Patent No.: US 7,739,806 B1
(45) Date of Patent: Jun. 22, 2010

(54) THREE-DIMENSIONAL COMBINATION MEASURING TOOL

(75) Inventor: Derek Theodorus Pater, Heathmont (AU)

(73) Assignees: Nedful Products Co., Ltd., Taichung (TW); Qualipro Enterprise Co., Ltd., Changhua Hsien (TW)

( * ) Notice: Subject to any disclaimer, the term of this patent is extended or adjusted under 35 U.S.C. 154(b) by 560 days.

(21) Appl. No.: 11/763,922

(22) Filed: Jun. 15, 2007

(51) Int. Cl.
*B43L 7/10* (2006.01)

(52) U.S. Cl. .................... 33/417; 33/415; 33/456; 33/471

(58) Field of Classification Search .......... 33/1 R, 33/1 N, 403, 415–419, 423–428, 451–454, 33/456, 459–462, 464, 465, 468–473, 483–486, 33/490, 491, 494, 197, 518
See application file for complete search history.

(56) References Cited

U.S. PATENT DOCUMENTS

| | | | | |
|---|---|---|---|---|
| 1,346,409 A | * | 7/1920 | Lucas | 33/473 |
| 1,894,886 A | * | 1/1933 | Paskowski | 33/453 |
| 5,205,045 A | * | 4/1993 | Liu | 33/468 |
| 5,461,794 A | * | 10/1995 | Huang | 33/470 |
| 6,260,283 B1 | * | 7/2001 | Abernathy et al. | 33/419 |
| 7,188,427 B2 | * | 3/2007 | Johnson | 33/471 |
| 7,269,909 B1 | * | 9/2007 | Barbieri | 33/419 |
| 7,278,217 B1 | * | 10/2007 | Mills | 33/276 |

* cited by examiner

*Primary Examiner*—Amy Cohen Johnson
(74) *Attorney, Agent, or Firm*—Alan Kamrath; Kamrath & Associates PA (57) ABSTRACT

A combination measuring tool includes a main body having a first portion having a plurality of first graduations and a second portion having a plurality of second graduations, a transverse bar movably and rotatably mounted on the main body and having a semi-circular protrusion having a plurality of angle scales, a protractor secured to the transverse bar and having a plurality of angle scales, a pivot plate pivotally mounted on the protractor, and a ruler movably mounted on the main body and having a plurality of graduations. Thus, the measuring and drawing angle of the combination measuring tool can be adjusted easily and freely, thereby facilitating a user operating the combination measuring tool to draw marking lines.

20 Claims, 12 Drawing Sheets

THREE-DIMENSIONAL COMBINATION MEASURING TOOL

BACKGROUND OF THE INVENTION

1. Field of the Invention

The present invention relates to a measuring tool and, more particularly, to a combination measuring tool having the function of a ruler, protractor and the like.

2. Description of the Related Art

A conventional ruler is used to measure the distance of an object. Thus, when a user wishes to connect rafters and posts to build a wooden house, the ruler is used to measure the distance and draw marking lines on the rafters and the posts to form mortises and tenons on the rafters and the posts by sawing so as to connect the rafters and posts by mortising. However, the ruler cannot measure or draw an oblique angle so that the ruler needs aid of other tool, such as a protractor or setsquare, to draw angled marking lines, thereby causing inconvenience to the user. In addition, the ruler cannot be used to form chamfered corners on the rafter and to form breaches in stairs, thereby limiting the versatility of the ruler.

BRIEF SUMMARY OF THE INVENTION

In accordance with the present invention, there is provided a combination measuring tool, comprising a main body having a first portion formed with a flattened side having a plurality of first graduations and a second portion formed with a through hole having a periphery formed with a plurality of second graduations, a transverse bar movably and rotatably mounted on the first portion of the main body and having a middle portion formed with a semi-circular protrusion having a plurality of angle scales, a protractor having a first portion secured to the transverse bar and a semi-circular second portion having a plurality of angle scales, a pivot plate pivotally mounted on the second portion of the protractor, and a ruler having a first portion movably mounted on the second portion of the main body and a second portion having a plurality of graduations.

The primary objective of the present invention is to provide a three-dimensional combination measuring tool.

Another objective of the present invention is to provide a combination measuring tool whose measuring and drawing angle can be adjusted easily and freely, thereby facilitating a user operating the combination measuring tool to draw marking lines.

A further objective of the present invention is to provide a combination measuring tool, wherein the main body, the transverse bar, the protractor and the pivot plate have an angle adjustable function to facilitate a user performing the mortising action.

A further objective of the present invention is to provide a combination measuring tool that is not only available for mortising but also available for forming a chamfered corner on a rafter or forming breaches on two opposite upright plates to form stairs, so that the combination measuring tool has multiple functions, thereby enhancing the versatility of the combination measuring tool.

Further benefits and advantages of the present invention will become apparent after a careful reading of the detailed description with appropriate reference to the accompanying drawings.

DETAILED DESCRIPTION OF THE INVENTION

Figure 1:
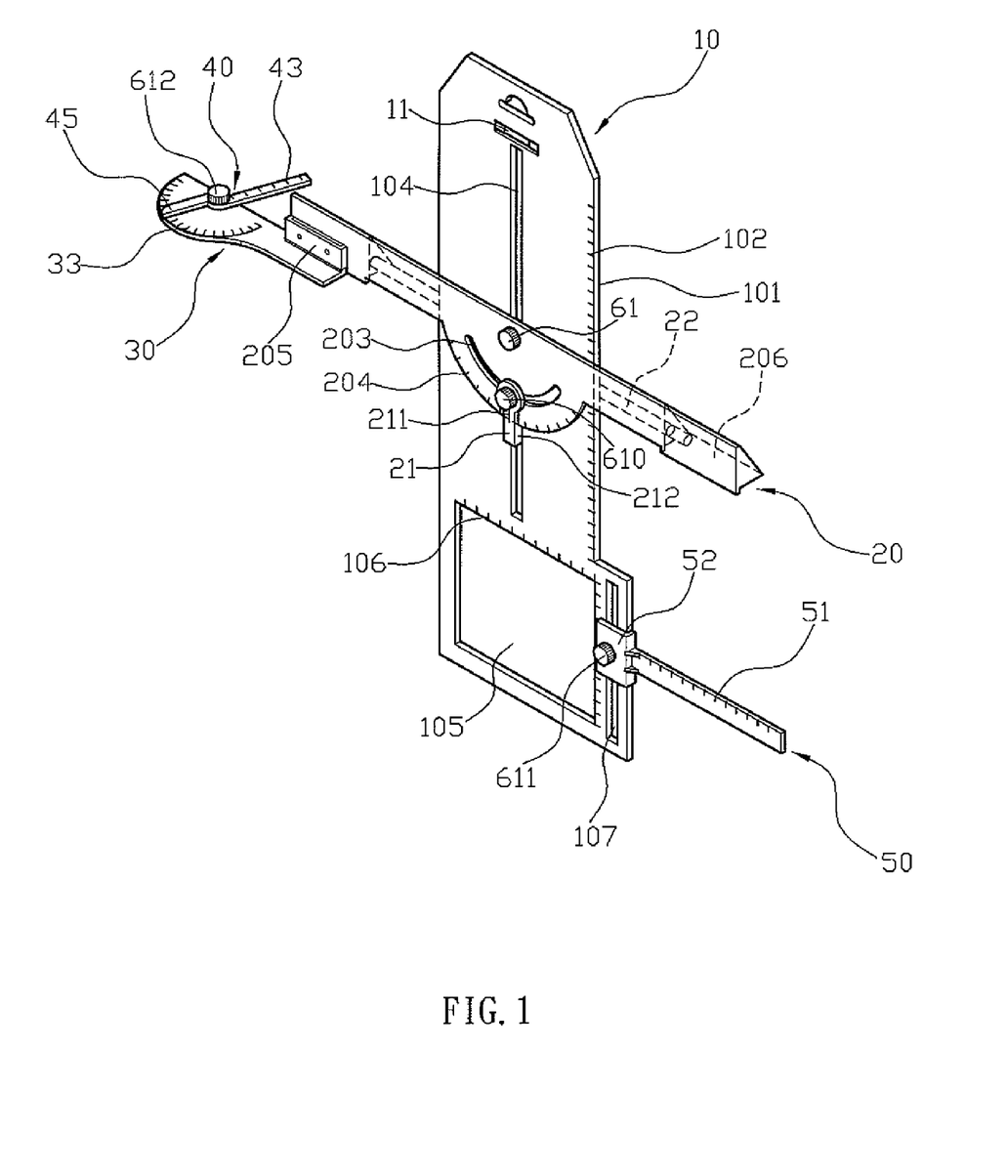
FIG. 1 is a perspective view of a combination measuring tool in accordance with the preferred embodiment of the present invention.
Figure 2:
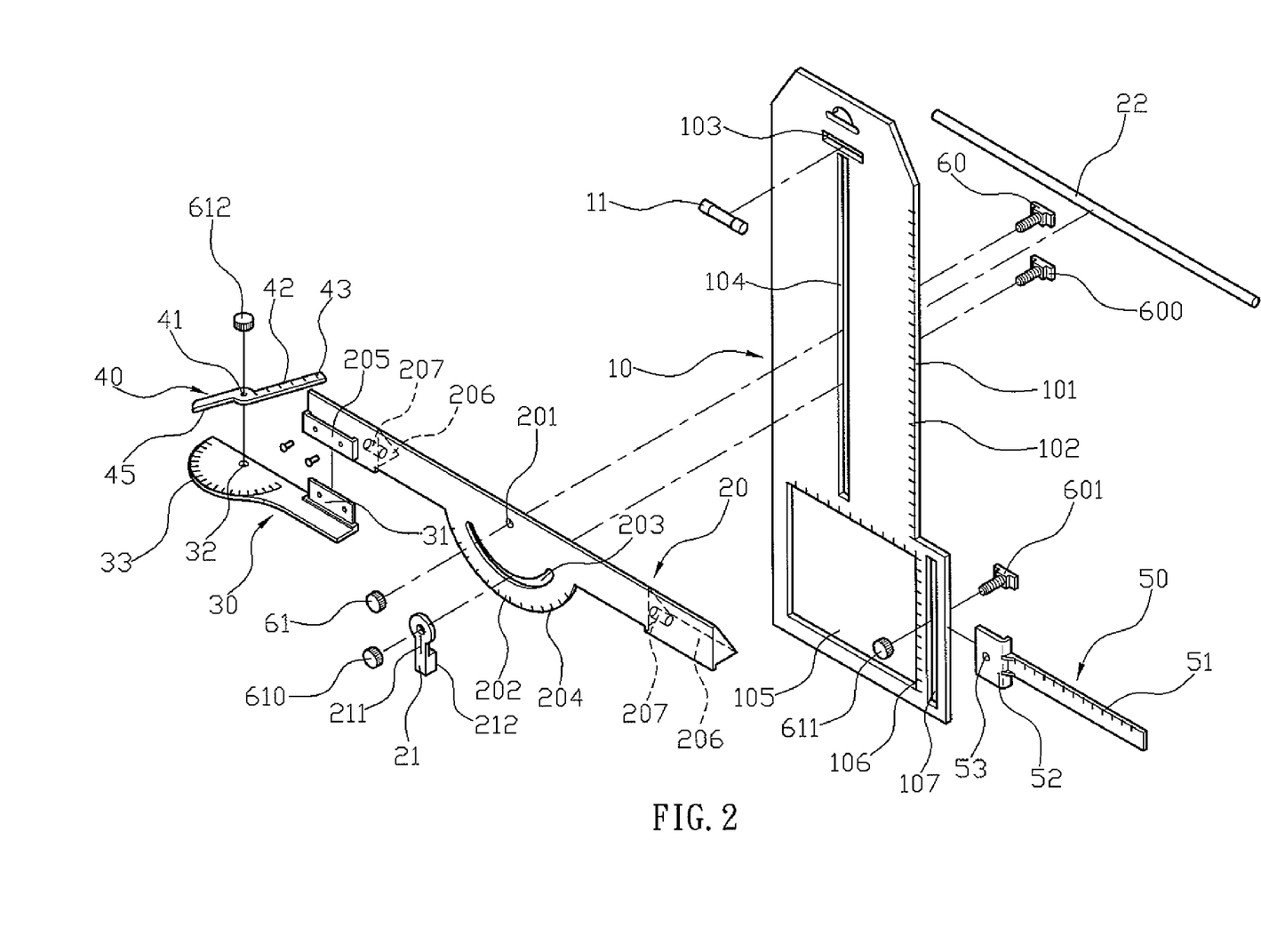
FIG. 2 is an exploded perspective view of the combination measuring tool as shown in FIG. 1.
Figure 3:
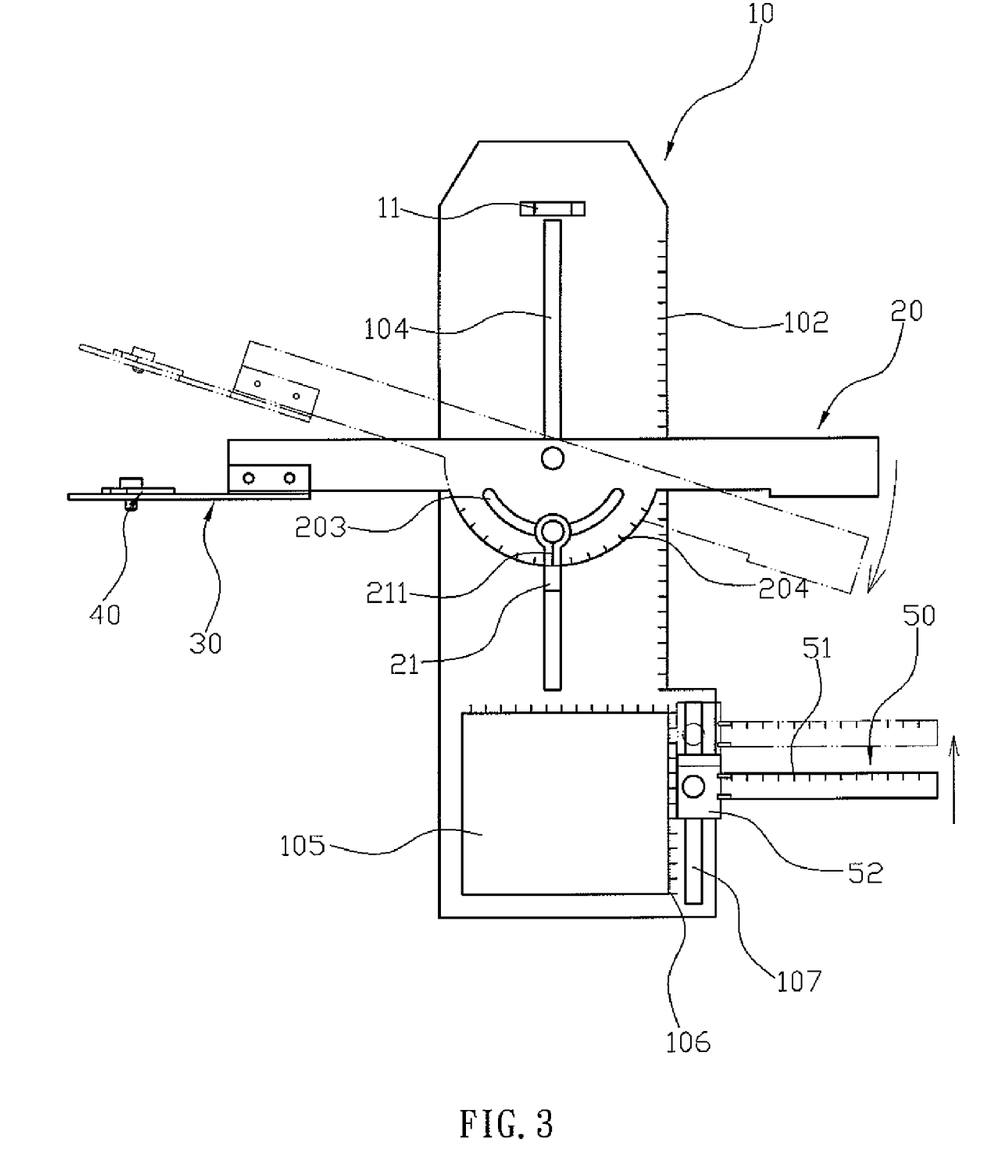
FIG. 3 is a front operational view of the combination measuring tool as shown in FIG. 1.

Referring to the drawings and initially to FIGS. 1-3, a combination measuring tool in accordance with the preferred embodiment of the present invention comprises a main body 10 having a first portion formed with a flattened side 101 having a plurality of first graduations 102 and a second portion formed with a through hole 105 having a periphery formed with a plurality of second graduations 106, a transverse bar 20 movably and rotatably mounted on the first portion of the main body 10 and having a middle portion formed with a semi-circular protrusion 202 having a plurality of angle scales 204, a protractor 30 having a first portion secured to the transverse bar 20 and a semi-circular second portion having a plurality of angle scales 33, a pivot plate 40 pivotally mounted on the second portion of the protractor 30, and a ruler 50 having a first portion 52 movably mounted on the second portion of the main body 10 and a second portion having a plurality of graduations 51.

The first portion of the main body 10 is formed with an axially extending guide slot 104 to guide movement of the transverse bar 20 and a transverse receiving hole 103 located beside the guide slot 104 for mounting a level 11. The second portion of the main body 10 is formed with an axially extending guide track 107 located beside the through hole 105 to guide movement of the ruler 50.

A transparent follower 21 is movable with the transverse bar 20 to move relative to the main body 10 and has a pointer 211 directed toward the angle scales 204 of the transverse bar 20 to point an included angle between the transverse bar 20 and the main body 10 when the transverse bar 20 is rotatable relative to the main body 10.

The semi-circular protrusion 202 of the transverse bar 20 has a central portion formed with a pivot hole 201 and has a face formed with an arc-shaped adjusting slot 203 located between the pivot hole 201 and the angle scales 204, and the combination measuring tool further comprises a pivot bolt 60 extended through the guide slot 104 of the main body 10 and the pivot hole 201 of the transverse bar 20, a locking nut 61 screwed onto the pivot bolt 60 and rested on the transverse bar 20, an adjusting bolt 600 extended through the guide slot 104 of the main body 10, the adjusting slot 203 of the transverse bar 20 and a first portion of the follower 21 to attach the follower 21 to the main body 10, and a retaining nut 610 screwed onto the adjusting bolt 600 and rested on the follower 21. The follower 21 has a second portion formed with a protruding slide 212 slidable in the guide slot 104 of the main body 10. The slide 212 of the follower 21 is limited by the guide slot 104 of the main body 10 so that the follower 21 is not rotatable with the transverse bar 20 when the transverse bar 20 is rotatable relative to the main body 10.

Thus, the pivot bolt 60 is movable in the guide slot 104 of the main body 10 to guide movement of the transverse bar 20 relative to the main body 10, and the transverse bar 20 is pivotable about the pivot bolt 60 and the pivot hole 201 and is rotatable relative to the main body 10 and the follower 21 as shown in FIG. 3.

The transverse bar 20 is provided with two opposite resting blocks 206 each formed with a fixing hole 207, and a reinforcing rod 22 is mounted between the resting blocks 206 of the transverse bar 20 to reinforce the strength of the transverse bar 20 and has two opposite ends each secured in the fixing hole 207 of a respective resting block 206 of the transverse bar 20. The main body 10 is located between the transverse bar 20 and the reinforcing rod 22. The transverse bar 20 has an end portion provided with a protruding support bracket 205.

The protractor 30 is located at one of two opposite ends of the transverse bar 20 and has a normal face perpendicular to that of the transverse bar 20. The first portion of the protractor 30 is provided with a protruding fixing piece 31 secured to the support bracket 205 of the transverse bar 20 to attach the protractor 30 to the transverse bar 20. The second portion of the protractor 30 has a central portion formed with a central bore 32.

The pivot plate 40 has a first portion formed with a pointer 45 directed toward the angle scales 33 of the protractor 30, a mediate portion formed with a pivot bore 41 pivotally mounted on the central bore 32 of the protractor 30 by a connecting member 612 and a deflected second portion 42 having a plurality of graduations 43.

The first portion 52 of the ruler 50 is formed with a through bore 53, and the combination measuring tool further comprises a fastening bolt 601 extended through the guide track 107 of the main body 10 and the through bore 53 of the ruler 50, and a fastening nut 611 screwed onto the fastening bolt 601 and rested on the ruler 50.

Figure 4:
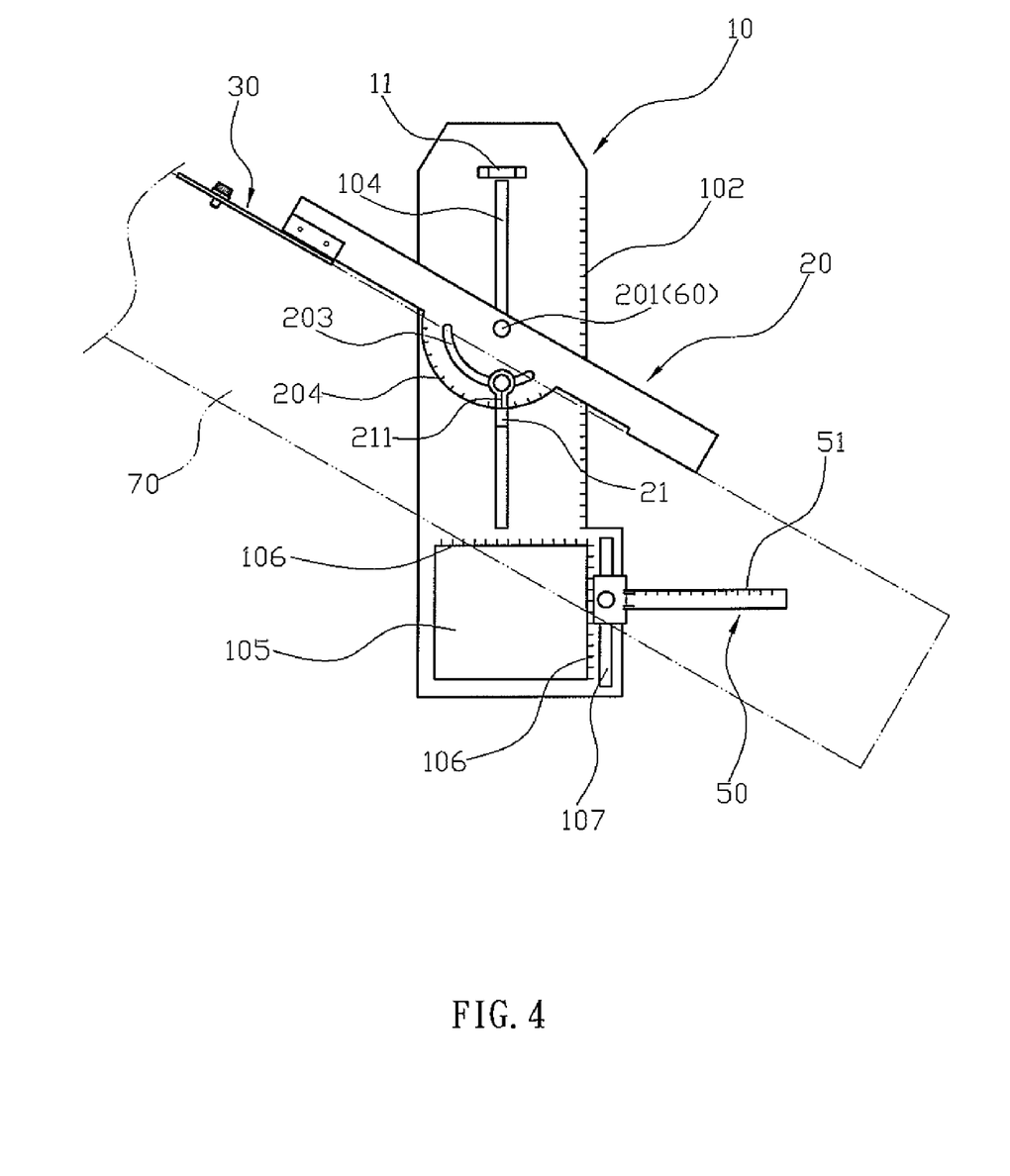
FIG. 4 is a front operational view of the combination measuring tool as shown in FIG. 1.
Figure 5:
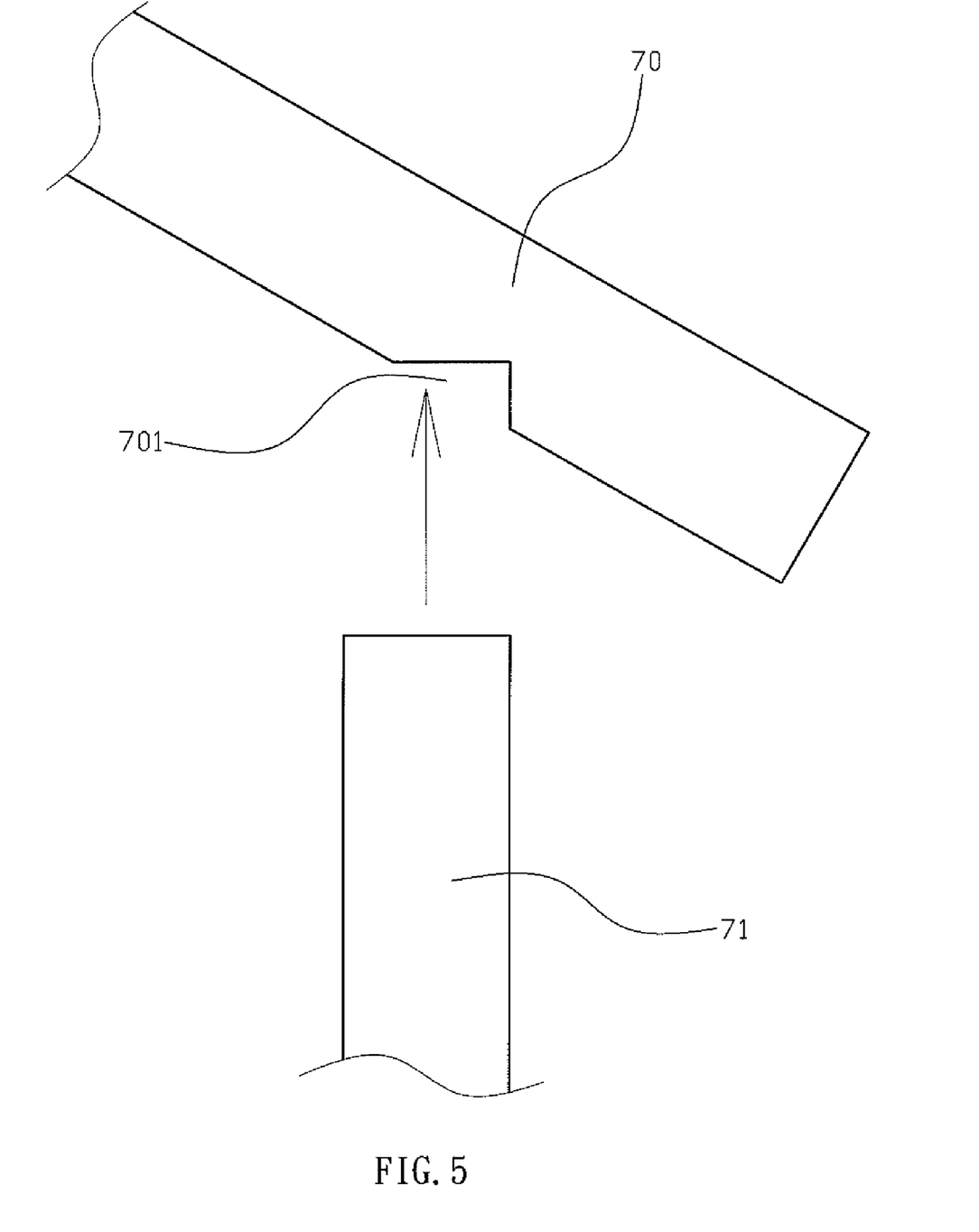
FIG. 5 is a front view showing the combination measuring tool forms a mortise on a rafter as shown in FIG. 4.
Figure 6:
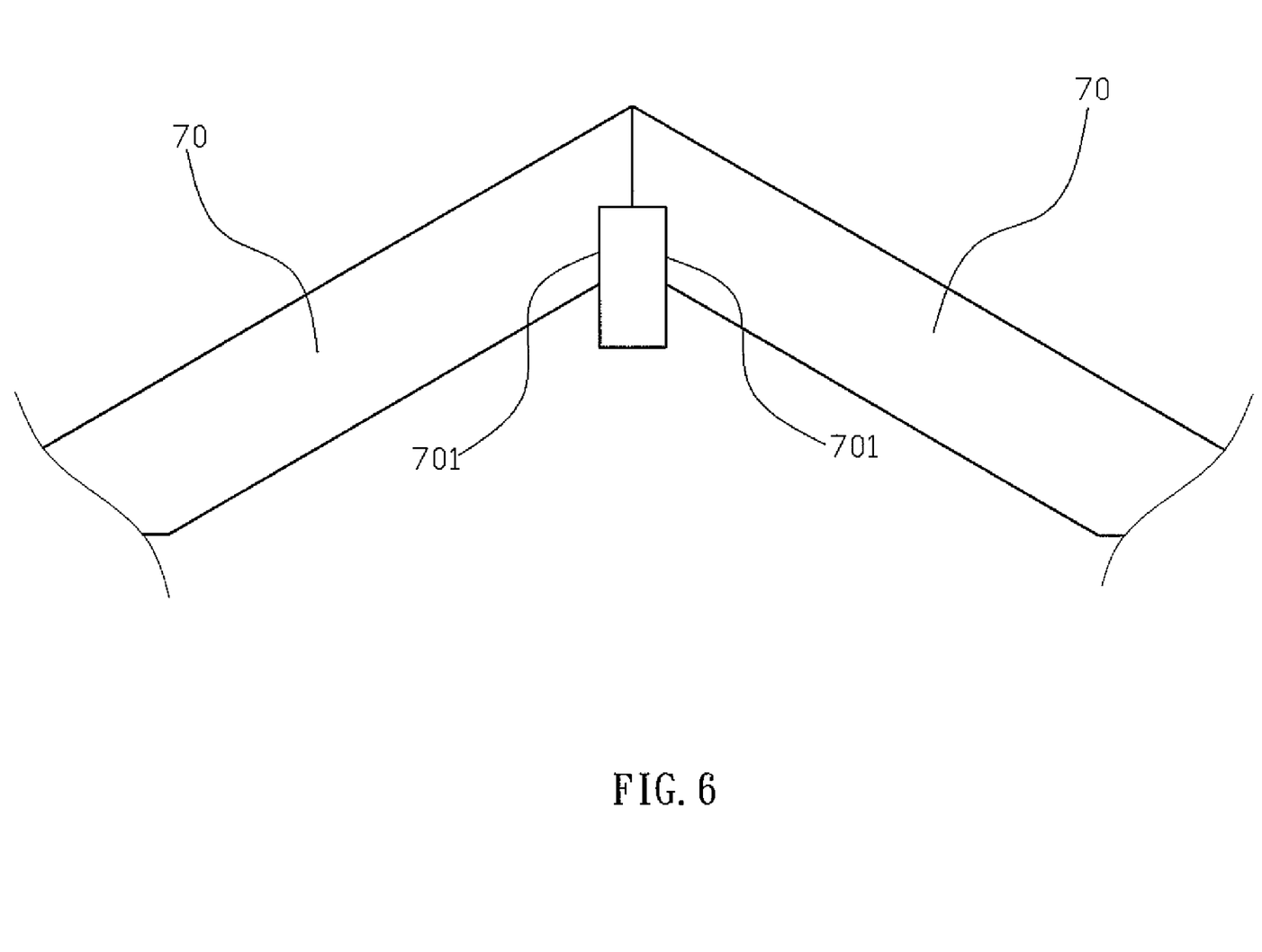
FIG. 6 is a front view showing the combination measuring tool forms a mortise on a rafter as shown in FIG. 4.
Figure 7:
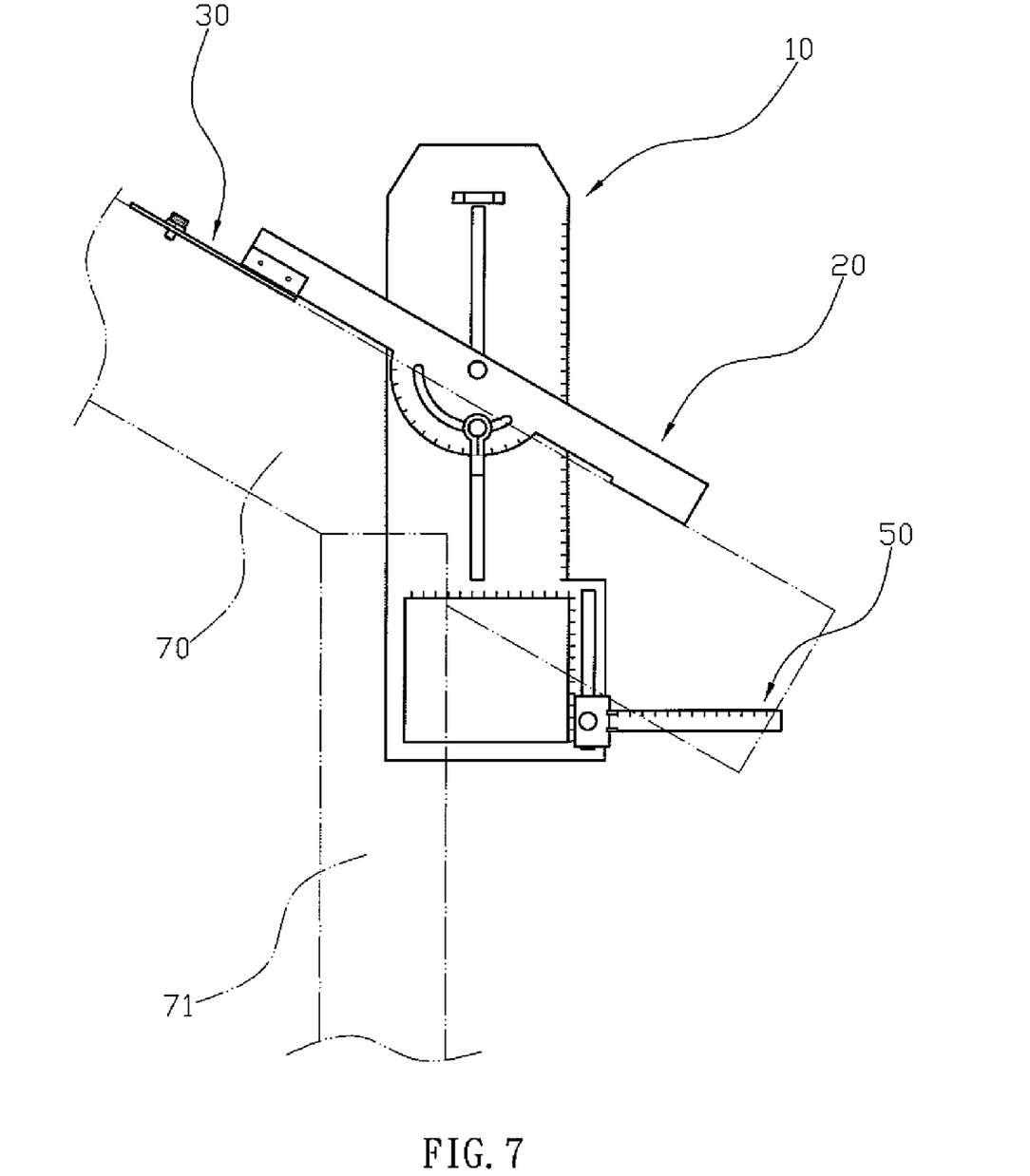
FIG. 7 is a front operational view of the combination measuring tool as shown in FIG. 1.
Figure 8:
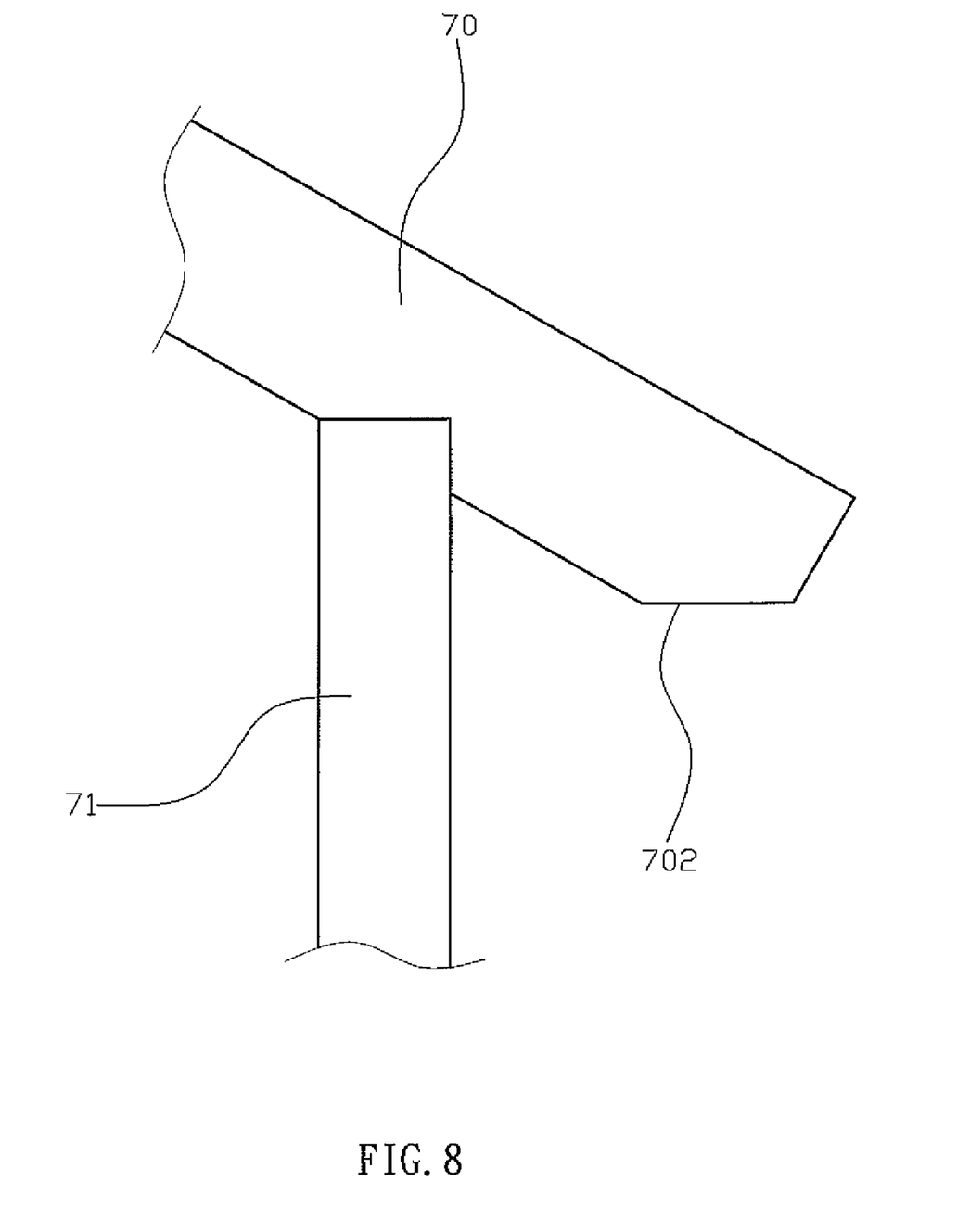
FIG. 8 is a front view showing the combination measuring tool forms a chamfered corner on a rafter as shown in FIG. 7.
Figure 9:
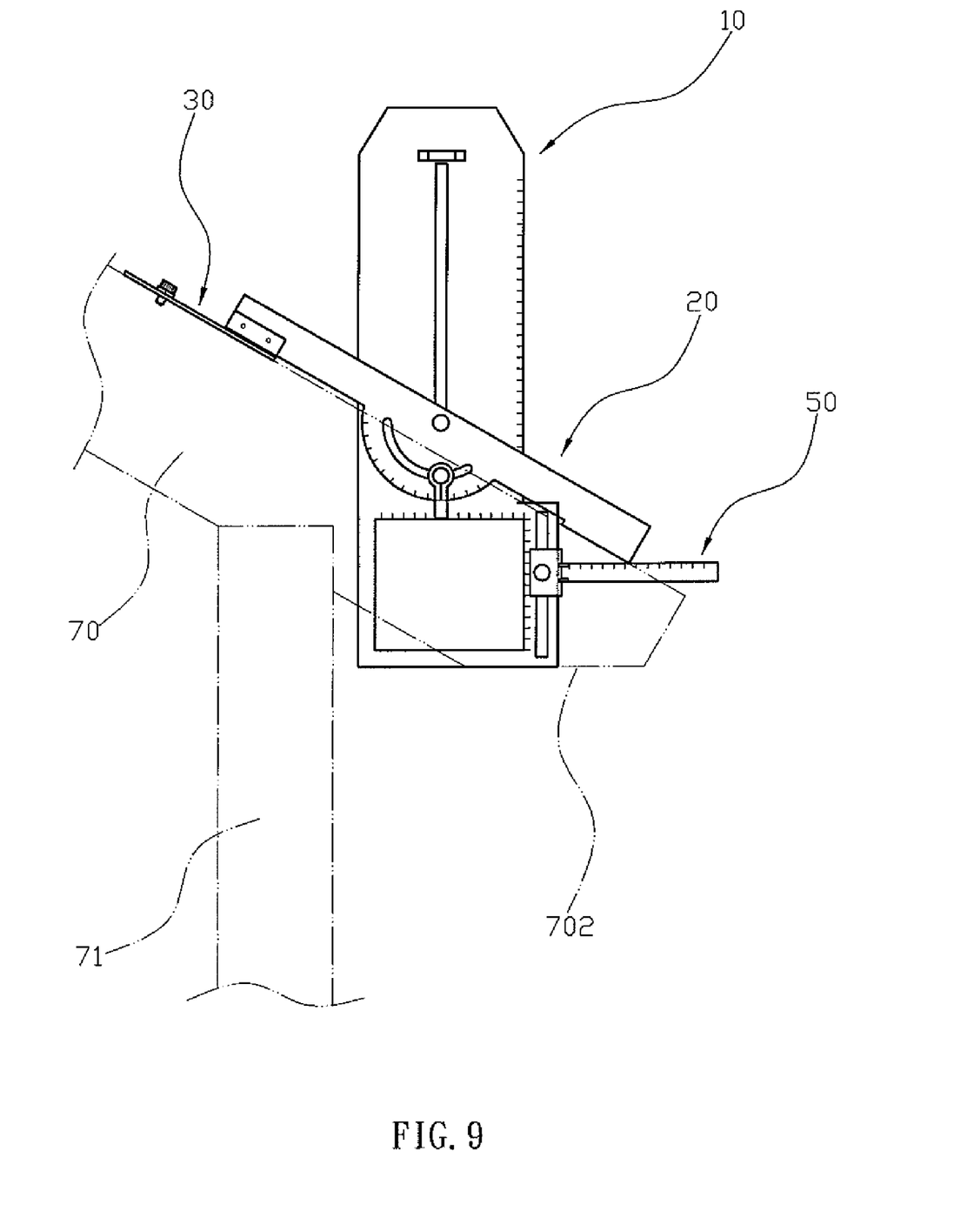
FIG. 9 is a front operational view of the combination measuring tool as shown in FIG. 1.
Figure 10:
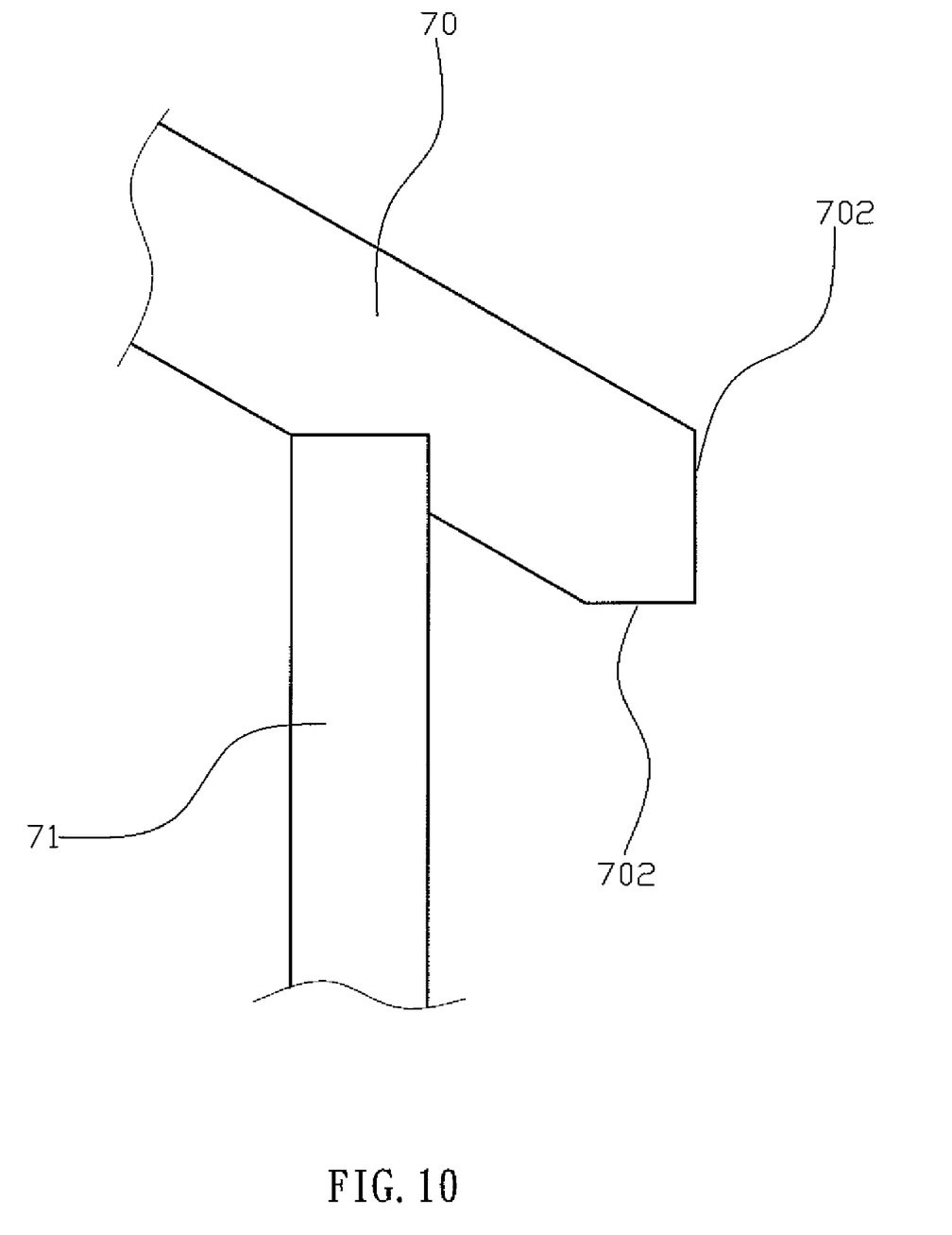
FIG. 10 is a front view showing the combination measuring tool forms a chamfered corner on a rafter as shown in FIG. 9.

As shown in FIGS. 4 and 5, the transverse bar 20 is pivotable about the pivot bolt 60 and the pivot hole 201 and is rotatable relative to the main body 10 and the follower 21 after the locking nut 61 is unscrewed from the pivot bolt 60 and the retaining nut 610 is unscrewed from the adjusting bolt 600 until the pointer 211 of the transparent follower 21 aligns with one of the angle scales 204 of the transverse bar 20 to exactly control the adjustment angle between the transverse bar 20 and the main body 10. Then, the locking nut 61 is screwed onto the pivot bolt 60, and the retaining nut 610 is screwed onto the adjusting bolt 600 to position the transverse bar 20. Then, the resting blocks 206 of the transverse bar 20 are rested on a rafter 70 so that the user can draw a marking line on the rafter 70 by the included angle between the main body 10 and the rafter 70 or by the edges of the through hole 105 of the main body 10 to form a mortise 701 on the rafter 70 by sawing for mortising a post 71. In addition, the user can measure the distance by the first graduations 102 and the second graduations 106 of the main body 10 and the graduations 51 of the ruler 50 to form mortises 701 on two juxtaposed rafters 70 as shown in FIG. 6.

As shown in FIGS. 7-10, the user can draw a marking line on the edge of the rafter 70 by the included angle between the ruler 50 and the rafter 70 to form a chamfered corner 702 on the rafter 70 by sawing.

Figure 11:
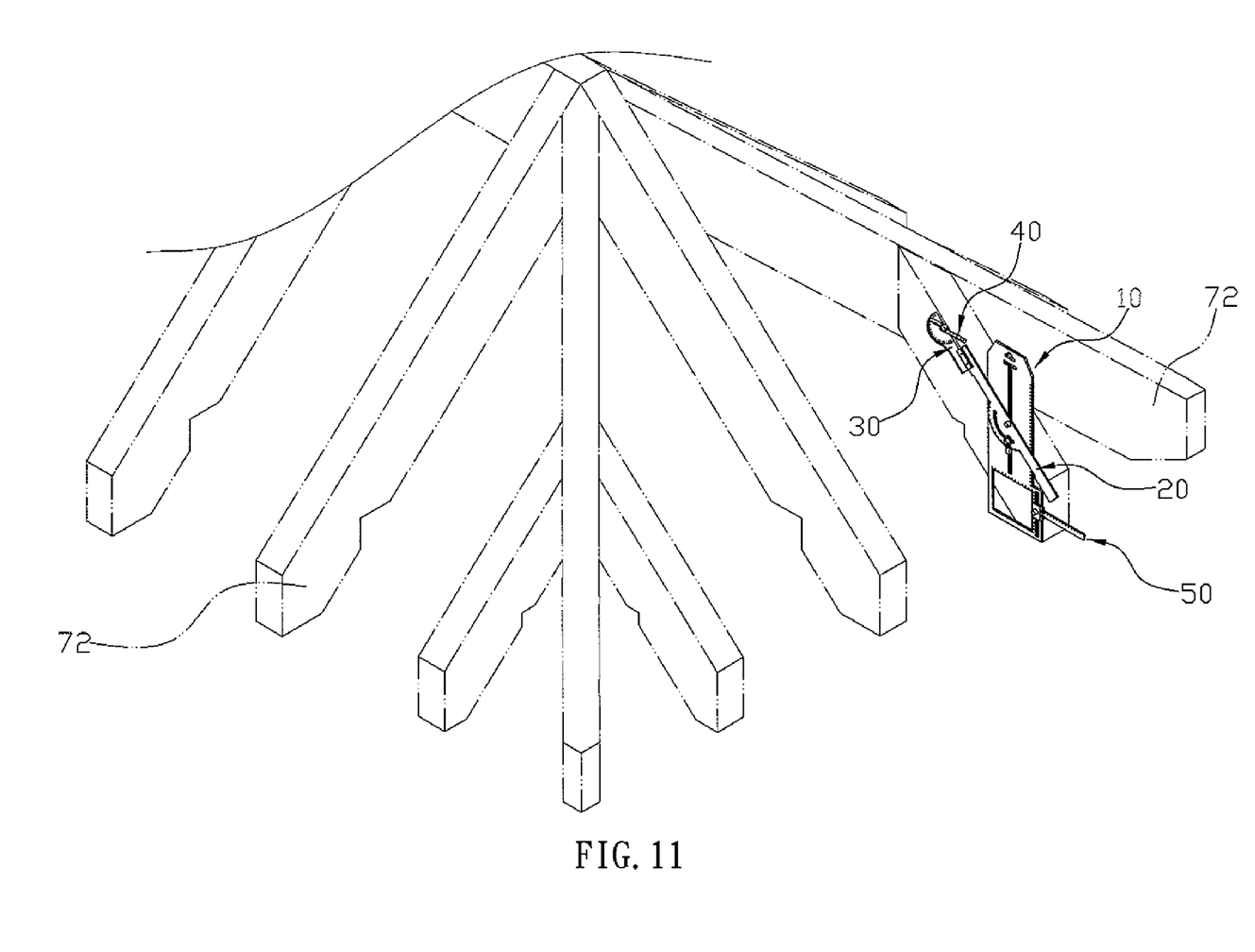
FIG. 11 is a perspective operational view of the combination measuring tool as shown in FIG. 1.

As shown in FIG. 11, the combination measuring tool can perform measuring and drawing functions along the Z-axis direction of a rafter 72 by co-operation of the protractor 30 and the pivot plate 40.

Figure 12:
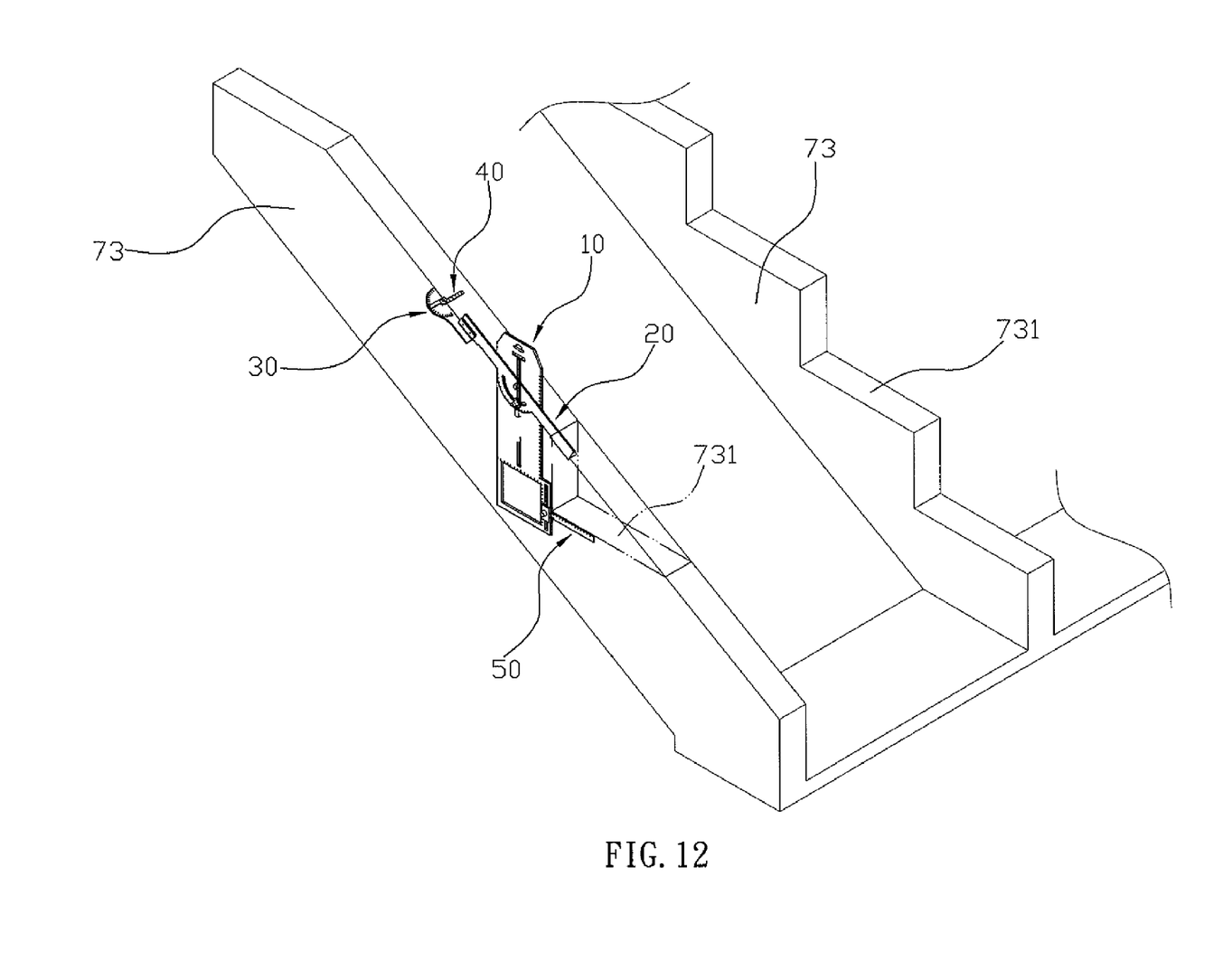
FIG. 12 is a perspective operational view of the combination measuring tool as shown in FIG. 1.

As shown in FIG. 12, the combination measuring tool can form a plurality of breaches 731 on two opposite upright plates 73 to form stairs between the upright plates 73.

Accordingly, the measuring and drawing angle of the combination measuring tool can be adjusted easily and freely, thereby facilitating a user operating the combination measuring tool to draw marking lines. In addition, the main body 10, the transverse bar 20, the protractor 30 and the pivot plate 40 have an angle adjustable function to facilitate a user performing the mortising action. Further, the combination measuring tool is not only available for mortising but also available for forming a chamfered corner on a rafter or forming breaches on two opposite upright plates to form stairs, so that the combination measuring tool has multiple functions, thereby enhancing the versatility of the combination measuring tool.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A combination measuring tool, comprising:
   a main body having a first portion formed with a flattened side having a plurality of first graduations and a second portion formed with a through hole having a periphery formed with a plurality of second graduations;
   a transverse bar movably and rotatably mounted on the first portion of the main body and having a middle portion formed with a semi-circular protrusion having a plurality of angle scales;
   a protractor having a first portion secured to the transverse bar and a semi-circular second portion having a plurality of angle scales;
   a pivot plate pivotally mounted on the second portion of the protractor;
   a ruler having a first portion movably mounted on the second portion of the main body and a second portion having a plurality of graduations.

2. The combination measuring tool in accordance with claim 1, wherein the first portion of the main body is formed with a transverse receiving hole for mounting a level.

3. The combination measuring tool in accordance with claim 1, further comprising a transparent follower movable with the transverse bar to move relative to the main body and having a pointer directed toward the angle scales of the transverse bar to point an included angle between the transverse bar and the main body when the transverse bar is rotatable relative to the main body.

4. The combination measuring tool in accordance with claim 3, wherein the first portion of the main body is formed with an axially extending guide slot to guide movement of the transverse bar.

5. The combination measuring tool in accordance with claim 4, wherein:
the semi-circular protrusion of the transverse bar has a central portion formed with a pivot hole;
the combination measuring tool further comprises:
a pivot bolt extended through the guide slot of the main body and the pivot hole of the transverse bar;
a locking nut screwed onto the pivot bolt and rested on the transverse bar.

6. The combination measuring tool in accordance with claim 5, wherein:
the semi-circular protrusion of the transverse bar has a face formed with an arc-shaped adjusting slot located between the pivot hole and the angle scales;
the combination measuring tool further comprises:
an adjusting bolt extended through the guide slot of the main body, the adjusting slot of the transverse bar and a first portion of the follower to attach the follower to the main body;
a retaining nut screwed onto the adjusting bolt and rested on the follower.

7. The combination measuring tool in accordance with claim 6, wherein the follower has a second portion formed with a protruding slide slidable in the guide slot of the main body.

8. The combination measuring tool in accordance with claim 7, wherein:
the slide of the follower is limited by the guide slot of the main body;
the follower is not rotatable with the transverse bar when the transverse bar is rotatable relative to the main body.

9. The combination measuring tool in accordance with claim 5, wherein:
the pivot bolt is movable in the guide slot of the main body to guide movement of the transverse bar relative to the main body;
the transverse bar is pivotable about the pivot bolt and the pivot hole and is rotatable relative to the main body and the follower.

10. The combination measuring tool in accordance with claim 6, wherein the transverse bar is pivotable about the pivot bolt and the pivot hole and is rotatable relative to the main body and the follower after the locking nut is unscrewed from the pivot bolt and the retaining nut is unscrewed from the adjusting bolt.

11. The combination measuring tool in accordance with claim 1, wherein the pivot plate has a first portion formed with a pointer directed toward the angle scales of the protractor and a deflected second portion having a plurality of graduations.

12. The combination measuring tool in accordance with claim 1, wherein:
the transverse bar is provided with two opposite resting blocks;
the combination measuring tool further comprises a reinforcing rod mounted between the resting blocks of the transverse bar to reinforce the strength of the transverse bar.

13. The combination measuring tool in accordance with claim 12, wherein:
each of the resting blocks of the transverse bar is formed with a fixing hole;
the reinforcing rod has two opposite ends each secured in the fixing hole of a respective resting block of the transverse bar.

14. The combination measuring tool in accordance with claim 12, wherein the main body is located between the transverse bar and the reinforcing rod.

15. The combination measuring tool in accordance with claim 1, wherein the second portion of the main body is formed with an axially extending guide track located beside the through hole to guide movement of the ruler.

16. The combination measuring tool in accordance with claim 1, wherein:
the transverse bar has an end portion provided with a protruding support bracket;
the first portion of the protractor is provided with a protruding fixing piece secured to the support bracket of the transverse bar to attach the protractor to the transverse bar.

17. The combination measuring tool in accordance with claim 1, wherein:
the first portion of the ruler is formed with a through bore;
the combination measuring tool further comprises:
a fastening bolt extended through the guide track of the main body and the through bore of the ruler;
a fastening nut screwed onto the fastening bolt and rested on the ruler.

18. The combination measuring tool in accordance with claim 1, wherein:
the second portion of the protractor has a central portion formed with a central bore;
the pivot plate has a mediate portion formed with a pivot bore pivotally mounted on the central bore of the protractor by a connecting member.

19. The combination measuring tool in accordance with claim 1, wherein the protractor is located at one of two opposite ends of the transverse bar.

20. The combination measuring tool in accordance with claim 1, wherein the protractor has a normal face perpendicular to that of the transverse bar.

* * * * *